(12) United States Patent
Moon et al.

(10) Patent No.: US 6,519,958 B1
(45) Date of Patent: Feb. 18, 2003

(54) CONTROL SYSTEM FOR STARTING OF AIR CONDITIONER AND CONTROL METHOD THEREOF

(75) Inventors: Joong-Ki Moon, Seoul (KR); Young-Man Kim, Seoul (KR); Jae-Myoung Moon, Suwon (KR); Jung-Min Lee, Suwon (KR); Jong-Youb Kim, Suwon (KR); Il-Yong Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/019,529
(22) PCT Filed: Jan. 5, 2001
(86) PCT No.: PCT/KR01/00021
§ 371 (c)(1), (2), (4) Date: Jan. 3, 2002
(87) PCT Pub. No.: WO01/94857
PCT Pub. Date: Dec. 13, 2001

(30) Foreign Application Priority Data

Jun. 7, 2000 (KR) .............................................. 00-31143
Dec. 30, 2000 (KR) .............................................. 00-86778

(51) Int. Cl.[7] .............................. F25B 41/00; F25B 5/00
(52) U.S. Cl. ........................... 62/199; 62/204; 62/196.3; 62/228.5
(58) Field of Search ....................... 62/199, 204, 196.3, 62/197, 228.1, 228.3, 228.5

(56) References Cited

U.S. PATENT DOCUMENTS

| | | | | |
|---|---|---|---|---|
| 6,047,556 A | * | 4/2000 | Lifson ........................ | 62/196.2 |
| 6,047,557 A | * | 4/2000 | Pham et al. ................ | 62/228.5 |
| 6,085,533 A | * | 7/2000 | Kaido et al. ................ | 62/196.2 |
| 6,206,652 B1 | * | 3/2001 | Caillat ........................ | 417/298 |
| 6,213,731 B1 | * | 4/2001 | Doepker et al. ............ | 417/310 |
| 6,393,852 B2 | * | 5/2002 | Pham et al. ................ | 62/228.5 |
| 6,408,635 B1 | * | 6/2002 | Pham et al. ................ | 62/222 |
| 6,412,293 B1 | * | 7/2002 | Pham et al. ................ | 62/228.3 |
| 6,438,974 B1 | * | 8/2002 | Pham et al. ................ | 62/126 |
| 6,449,972 B2 | * | 9/2002 | Pham et al. ................ | 62/228.3 |
| 2001/0045097 A1 | * | 11/2001 | Pham et al. ................ | 62/132 |
| 2001/0049942 A1 | * | 12/2001 | Pham et al. ................ | 62/126 |

FOREIGN PATENT DOCUMENTS

| | | |
|---|---|---|
| KR | 87-5221 A | 6/1987 |
| KR | 89-5469 A | 5/1989 |
| KR | 94-18623 A | 10/1994 |
| KR | 97-22002 A | 5/1997 |
| KR | 97-66360 A | 10/1997 |

* cited by examiner

*Primary Examiner*—Denise L. Esquivel
*Assistant Examiner*—Marc Norman
(74) *Attorney, Agent, or Firm*—Staas & Halsey LLP (57) ABSTRACT

A system includes a compressor and an expansion valve. The exit side of the compressor and the inlet side of the expansion valve are connected by a high pressure conduit, and the exit side of the expansion valve and the inlet side of the compressor are connected by a low pressure conduit. A bypass conduit is connected to the high pressure conduit and the low pressure conduit and a flow rate regulating valve is mounted on the bypass conduit. A control unit controls the expansion valve and the flow rate regulating valve to perform two starting operations in such a way that the flow rate regulating valve is open and the expansion valve is closed in a first starting operation, and the flow rate regulating valve is closed and the electronic expansion valve is open to a predetermined extent in a second starting operation. The compressor is controlled by a duty control signal having a period shorter than a period during a normal operation for starting operations.

15 Claims, 6 Drawing Sheets

CONTROL SYSTEM FOR STARTING OF AIR CONDITIONER AND CONTROL METHOD THEREOF

TECHNICAL FIELD

The present invention relates generally to air conditioners, and in particular to a system and method for controlling the starting of an air conditioner that employs a pulse width modulated compressor.

BACKGROUND ART

With the enlargement of buildings, there is an increasing consumer demand for a multi-air conditioner in which a plurality of indoor units are connected to a single outdoor unit. In such a multi-air conditioner, the length of each refrigerant conduit connecting each indoor unit to the outdoor unit is long because the outdoor unit is relatively far away from the indoor unit, so the amount of filled refrigerant is large and liquid refrigerant can enter the compressor during the starting of the air conditioner.

In particular, if power supply to any indoor unit is abruptly cut off during the operation of a multi-air conditioner, there is increased a possibility that liquid refrigerant enters the compressor. When the power of an indoor unit is abruptly cut off during operation, an electronic expansion valve is not closed because power supply to the electronic expansion valve constituting an element of the indoor unit is cut off. Accordingly, high pressure liquid refrigerant situated in a refrigerant conduit between the condenser and the electronic expansion valve enters the compressor or an accumulator upstream of the compressor through the electronic expansion valve and the evaporator in a non-evaporated state.

This phenomenon is continued until the pressures of high and low pressure sides are balanced. The liquid refrigerant having entered the compressor is mixed with oil contained in the compressor to dilute the oil, so the lubrication of the friction portions of the compressor is deteriorated, thereby damaging the compressor.

Meanwhile, for the multi-air conditioner, a great cooling capacity is required and each indoor unit is frequently turned on/off, so the required cooling capacity is changed. In order to meet such a demand, a variable rotation number compressor having a large and variable capacity is employed in the multi-air conditioner. In such a variable rotation number compressor, the capacity of the compressor is regulated to be suitable for a variation in required cooling capacity in such a way that the rotation number of a motor is controlled by varying the frequency of current applied to the motor in an inverter control manner. However, the conventional variable rotation number compressor is problematic in that the rotation number of its motor cannot be controlled with a desirable response and a precision because the motor being rotated has to be controlled directly according to a required cooling capacity. Additionally, since the rotation number of the motor is frequently varied, vibrations and noises occur, thereby causing problems that the life spans of the motor and the compressor are shortened and the mechanical reliability of an entire system is deteriorated.

In addition, since an expensive and complicated circuit device is required and power consumption is great in order to vary the frequency of current applied to the motor, the conventional variable rotation number compressor is less efficient than a general compressor. Particularly, in the conventional variable rotation number compressor are required several power conversions of initially inputted commercial AC power into DC power and this DC power into AC power having a required frequency through converters, so the structure of the circuit device is complicated and noises are frequently generated in the circuit device.

In addition, a large-capacity, variable rotation number compressor is problematic in that it is difficult to control the compressor, the efficiency of the compressor is low, the size of the compressor is large and the cost of the compressor is high, so it is difficult to fulfill large-capacity requirements with the variable rotation number compressor. Accordingly, in order to fulfill a large capacity requirement two or more compressors are employed. In this case, a standard compressor in which its motor is rotated at a constant speed is generally utilized together with the variable rotation number compressor. If a plurality of compressors are utilized, the entire size of an outdoor unit is enlarged and, accordingly, the handling of the outdoor unit becomes difficult.

Pulse width modulated compressors are disclosed as other variable capacity compressors in U.S. Pat. No. 6,047,557 and Japanese Unexamined Pat. Publication No. Hei 8-334094. These compressors are utilized in refrigerating systems each having a plurality of freezing compartments or refrigerating compartments, and designed to be applied to short piping in which the portion of a refrigerant conduit situated between a compressor and an evaporator is short. Consequently, these compressors cannot be directly applied to air conditioning systems for buildings that indispensably employ long piping and are given control environments different from those for the refrigerating systems. Additionally, in the prior art, there is not disclosed a control system and method for utilizing a pulse width modulated compressor in an multi-air conditioner, and in particular a control system and method for rapidly and safely performing the starting of an air conditioner, preventing liquid refrigerant from entering a compressor during a starting operation or connecting starting and normal operations smoothly.

DISCLOSURE OF THE INVENTION

Accordingly, the present invention has been made keeping in mind the above problems occurring in the prior art, and an object of the present invention is to provide a system and method for controlling the starting of an air conditioner employing a pulse width modulated compressor, which is capable of rapidly and safely performing the starting of the air conditioner.

Another object of the present invention is to provide a system and method for controlling the starting of an air conditioner, which is capable of preventing the inflow of liquid refrigerant in the air conditioner employing a pulse width modulated compressor.

A further object of the present invention is to provide a system and method for controlling the starting of an air conditioner employing a pulse width modulated compressor, which performs the starting operation of the compressor at two stages, thereby allowing starting and normal operations to be smoothly connected.

In order to accomplish the above objects, in accordance with the principles of the present invention, a system for controlling the starting of an air conditioner comprises a compressor controlled in a pulse width modulation manner according to a duty control signal; an electronic expansion valve for expanding refrigerant compressed in the compressor; a high pressure conduit connecting the exit side of the compressor and the inlet side of the electronic expansion valve; a low pressure conduit connecting the exit side of the electronic expansion valve and the inlet side of the compressor; a bypass conduit connected at its first end to the high pressure conduit and at its second end to the low pressure conduit; a flow rate regulating valve mounted on the bypass conduit for regulating a flow rate of fluid flowing through the bypass conduit; and a control unit for controlling the electronic expansion valve, the flow rate regulating valve and the compressor to perform two stage starting operations in such a way that the flow rate regulating valve is opened and the electronic expansion valve is closed in a first starting operation, and the flow rate regulating valve is closed and the electronic expansion valve is opened in a second starting operation, and the compressor being controlled by a duty control signal having a period shorter than a period for a normal operation during said starting operations.

In accordance with another aspect of the principles of the present invention, a method for controlling the starting of an air conditioner having a compressor controlled in a pulse width modulation manner according to a duty control signal comprises determining whether a starting signal for the compressor is inputted; operating the compressor for a predetermined time period at a period of duty control signal shorter than a period of duty control signal for a normal operation while closing the electronic expansion valve and opening a flow rate regulating valve positioned on a bypass conduit connecting exit and inlet sides of the compressor in a first starting operation, when the starting signal is inputted; and operating the compressor for a predetermined time period at a period of duty control signal shorter than a period of duty control signal for a normal operation while opening the electronic expansion valve to a predetermined extent and opening the flow rate regulating valve in a second starting operation.

DESCRIPTION OF REFERENCE CHARACTERS OF PRINCIPAL PARTS

2: compressor
5: evaporator
8: outdoor unit
9: indoor unit
26: pulse width modulated valve
27: outdoor control unit
28: outdoor communication circuit unit
29: indoor control unit
33: compressor temperature sensor
34: condenser temperature sensor

BEST MODE FOR CARRYING OUT THE INVENTION

Figure 1:
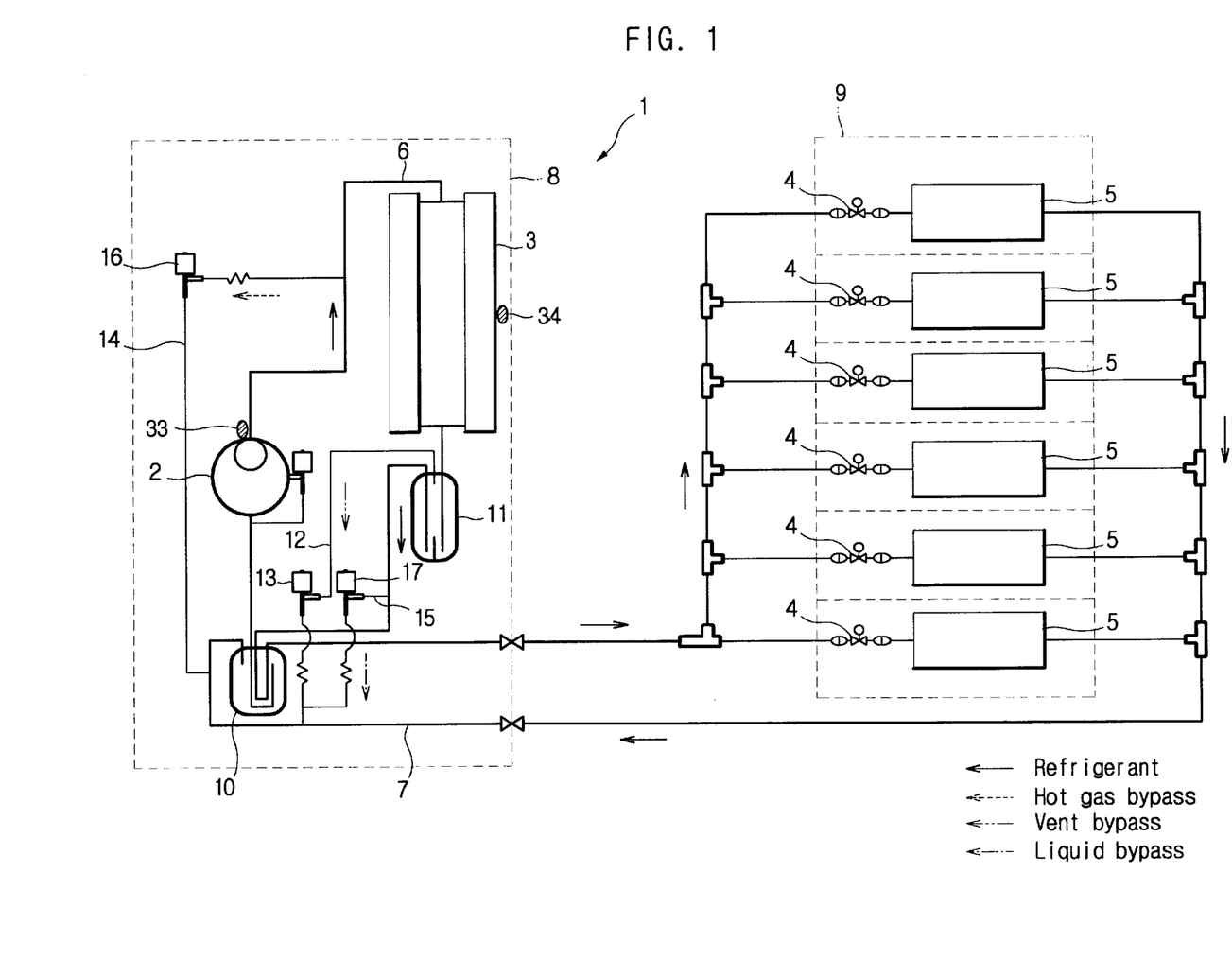
FIG. 1 is a diagram showing the cycle of a system for controlling the starting of an air conditioner in accordance with the present invention.

Hereinafter, embodiments of the present invention are described in detail with reference to accompanying drawings. FIG. 1 is a diagram showing an embodiment of the cycle of a system for controlling the starting of an air conditioner in accordance with the principles of the present invention. The air conditioner 1 of the present invention includes a compressor 2, a condenser 3, a plurality of electronic expansion valves 4, and a plurality of evaporators 5, which are connected to each other by refrigerant conduits to form a closed circuit. Of the refrigerant conduits, a refrigerant conduit connecting the outflow side of the compressor 2 to the inflow side of the electronic expansion valves 4 is a high pressure conduit 6 for guiding the flow of high pressure refrigerant discharged from the compressor 2, while a refrigerant conduit connecting the outflow side of the electronic expansion valves 4 to the inflow side of the compressor 2 is a low pressure conduit 7 for guiding the flow of low pressure refrigerant expanded in the electronic expansion valves 4. The condenser 3 is situated on the high pressure conduit 6, while the evaporators 5 are situated on the low pressure conduit 7. While the compressor 2 is operated, refrigerant flows in solid arrow directions.

The air conditioner 1 includes an outdoor unit 8 and a plurality of indoor units 9. The outdoor unit 8 includes the above described compressor 2 and condenser 3. The outdoor unit 8 further includes an accumulator 10 situated on the low pressure conduit 7 upstream of the compressor 2 and a receiver 11 situated on the high pressure conduit 6 downstream of the condenser 3. The accumulator 10 serves to collect and evaporate liquid refrigerant having not been evaporated and allow evaporated refrigerant to flow into the compressor 2. If refrigerant is not evaporated completely in the evaporators 5, refrigerant entering the accumulator 10 is a mixture of liquid refrigerant and gaseous refrigerant. The accumulator 10 evaporates liquid refrigerant, and allows only gaseous refrigerant (gas refrigerant) to enter the compressor 2. To this end, it is desirable to situate the entrance and exit ends of the refrigerant conduit in the upper portion of the accumulator 10.

If refrigerant is not condensed completely in the condenser 3, refrigerant entering the receiver 11 is a mixture of liquid refrigerant and gaseous refrigerant. The receiver 11 is constructed to separate the liquid refrigerant and the gaseous refrigerant from each other and to allow only the liquid refrigerant to be discharged. To this end, the entrance and exit ends of the refrigerant conduit situated inside of the receiver 11 are extended to the lower portion of the receiver 11.

In order to bypass gaseous refrigerant situated in the receiver 11, a vent bypass conduit 12 is provided to connect the receiver 11 to the low pressure conduit 7 upstream of the accumulator 10. The entrance end of the vent bypass conduit 12 is situated in the upper portion of the receiver 11, so only gaseous refrigerant enters the vent bypass conduit 12. A vent valve 13 is provided on the vent bypass conduit 12 and controls the flow rate of gaseous refrigerant bypassed. Double dotted arrows indicate the flow direction of the gaseous refrigerant flowing through the vent bypass conduit 12.

The portion of the high pressure conduit 6 extended from the receiver 11 is constructed to pass through the accumulator 10. This construction is to evaporate the liquid refrigerant of low temperature collected in the accumulator 10 by using the refrigerant of relatively high temperature passing through the high pressure conduit 6. In order to effectively evaporate the refrigerant, the portion of the low pressure conduit 7 situated in the accumulator 10 is formed in the shape of U, while the portion of the high pressure conduit 6 passing through the accumulator 10 is positioned to pass through the interior of the U-shaped portion of the low pressure conduit 7.

The outdoor unit 8 further includes a hot gas bypass conduit 14 connecting the portion of the high pressure conduit 6 between the compressor 2 and the condenser 3 to the accumulator 10, and a liquid bypass conduit 15 connecting the downstream side of the receiver 11 and the upstream side of the accumulator 10. A hot gas valve 16 is situated on the hot gas bypass conduit 16 to control the flow rate of hot gas bypassed, and a liquid valve 17 is situated on the liquid bypass conduit 15 to control the flow rate of liquid refrigerant bypassed. Accordingly, when the hot gas valve 16 is opened, a portion of hot gas discharged from the compressor 2 flows along the hot gas bypass conduit 14 in the direction indicated by the dotted arrow of FIG. 1; when the liquid valve 17 is opened, a portion of liquid refrigerant discharged from the receiver 11 flows along the liquid bypass conduit 15 in the directions indicated by the double dotted arrow of FIG. 1.

A plurality of indoor units 9 are arranged in parallel. Each of the indoor units 9 includes an electronic expansion valve 4 and an evaporator 5. Consequently, a plurality of indoor units 9 are connected to a single outdoor unit 8. The capacities and shapes of indoor units may be identical with or different from one another.

A compressor temperature sensor 33 is positioned on the exit side of the compressor 2 to sense the temperature of discharged refrigerant gas, while a condenser temperature sensor 34 is positioned on the center of the condenser 3 to sense the temperature of the condenser 3, preferably, the temperature of the center of the condenser 3. The compressor temperature sensor 33 and the condenser temperature sensor 34 are connected to the outdoor control unit 27, as described below.

Figure 2A:
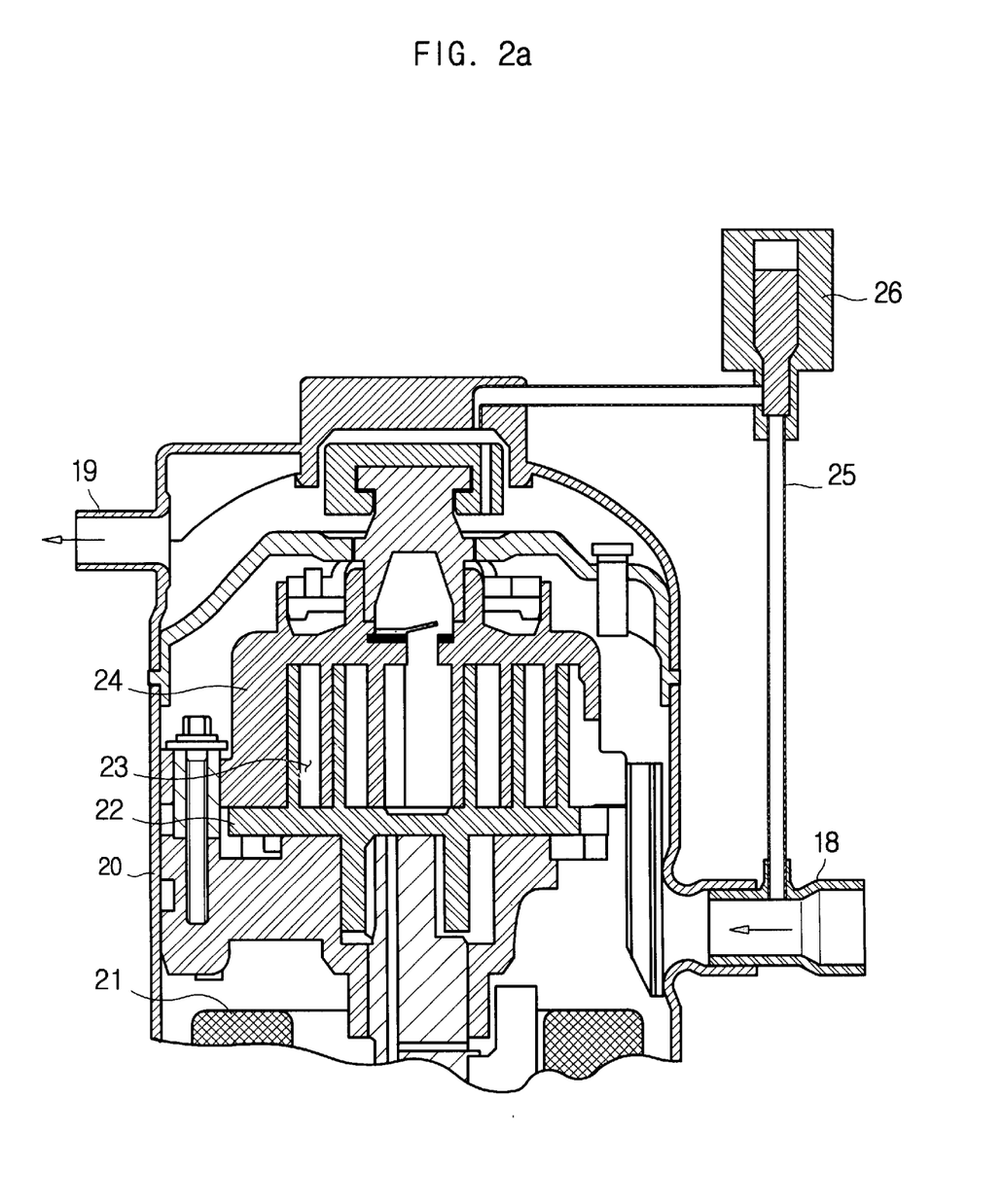
FIG. 2a is a sectional view showing a pulse width modulated compressor in a loading position.
Figure 2B:
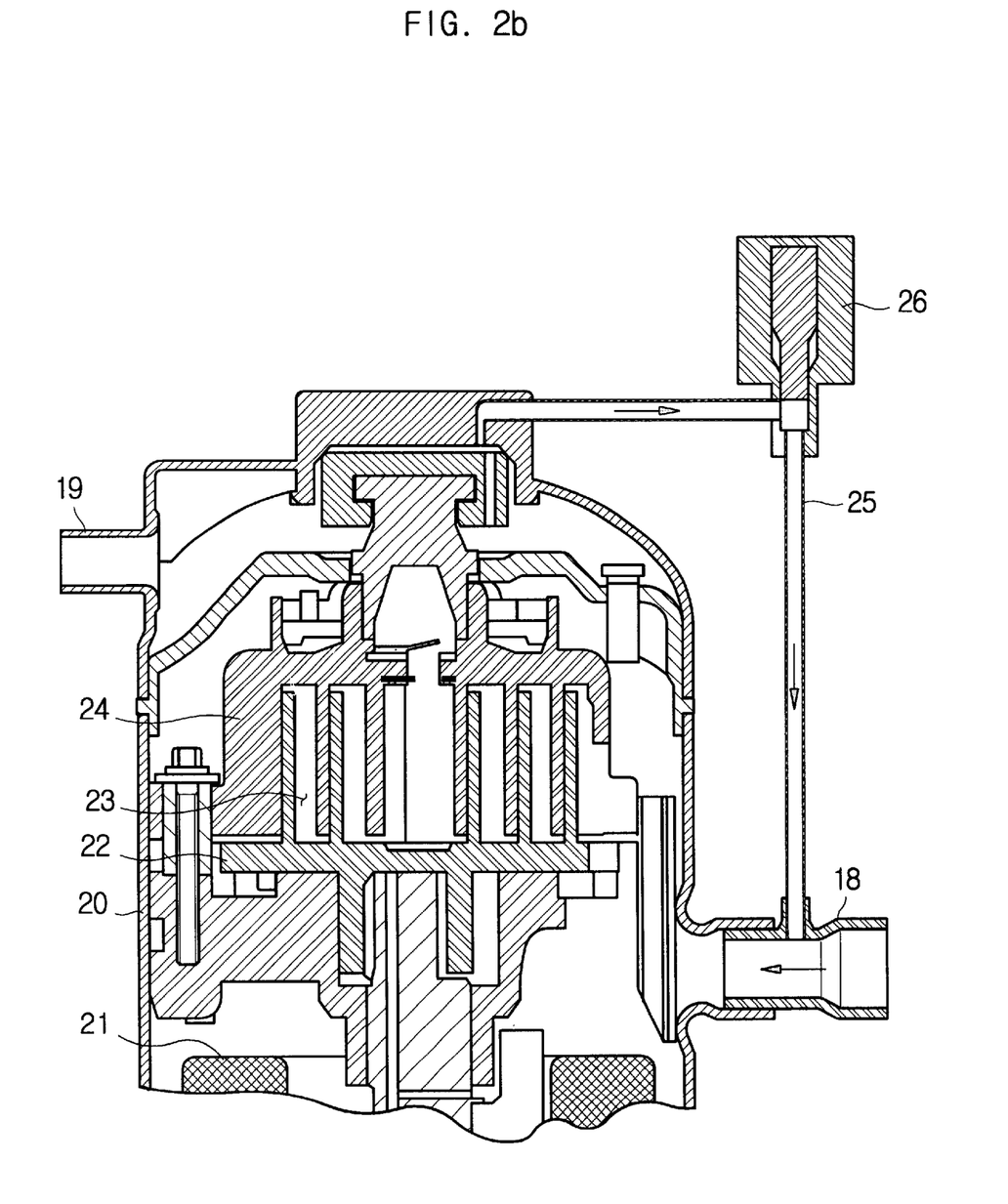
FIG. 2b is a sectional view showing the pulse width modulated compressor in an unloading position.

As depicted in FIGS. 2a and 2b, a variable capacity compressor controlled in a pulse width modulation fashion are employed as the compressor 2. The compressor 2 includes a casing 20 provided with an inlet 18 and an outlet 19, a motor 21 situated in the casing 20, a rotating scroll 22 rotated by the rotating force of the motor 21, and a stationary scroll 24 defining a compressing chamber 23 together with the rotating scroll 22. A bypass conduit 25 is attached to the casing 20 to connect a position over the stationary scroll 24 to the inlet 18, and a PWM valve (Pulse Width Modulated Valve) 26 in the form of a solenoid valve is mounted on the bypass conduit 25. In FIG. 2a, the PWM valve 26 is OFF and closes the bypass conduit 25. In this state, the compressor 2 discharges refrigerant. This state is referred to as "a loading state", and in this state the compressor 2 is operated at 100% capacity. In FIG. 2a, the PWM valve 26 is ON and opens the bypass conduit 25. In this state, the compressor 2 does not discharge refrigerant. This state is referred to as "a unloading state", and in this state the compressor 2 is operated at 0% capacity. Power is supplied to the compressor 2 regardless of the loading and unloading states, and the motor 21 is rotated at a constant speed. When power is not supplied to the compressor 2, the motor 21 is not rotated and the compressor 2 is not operated.

Figure 3:
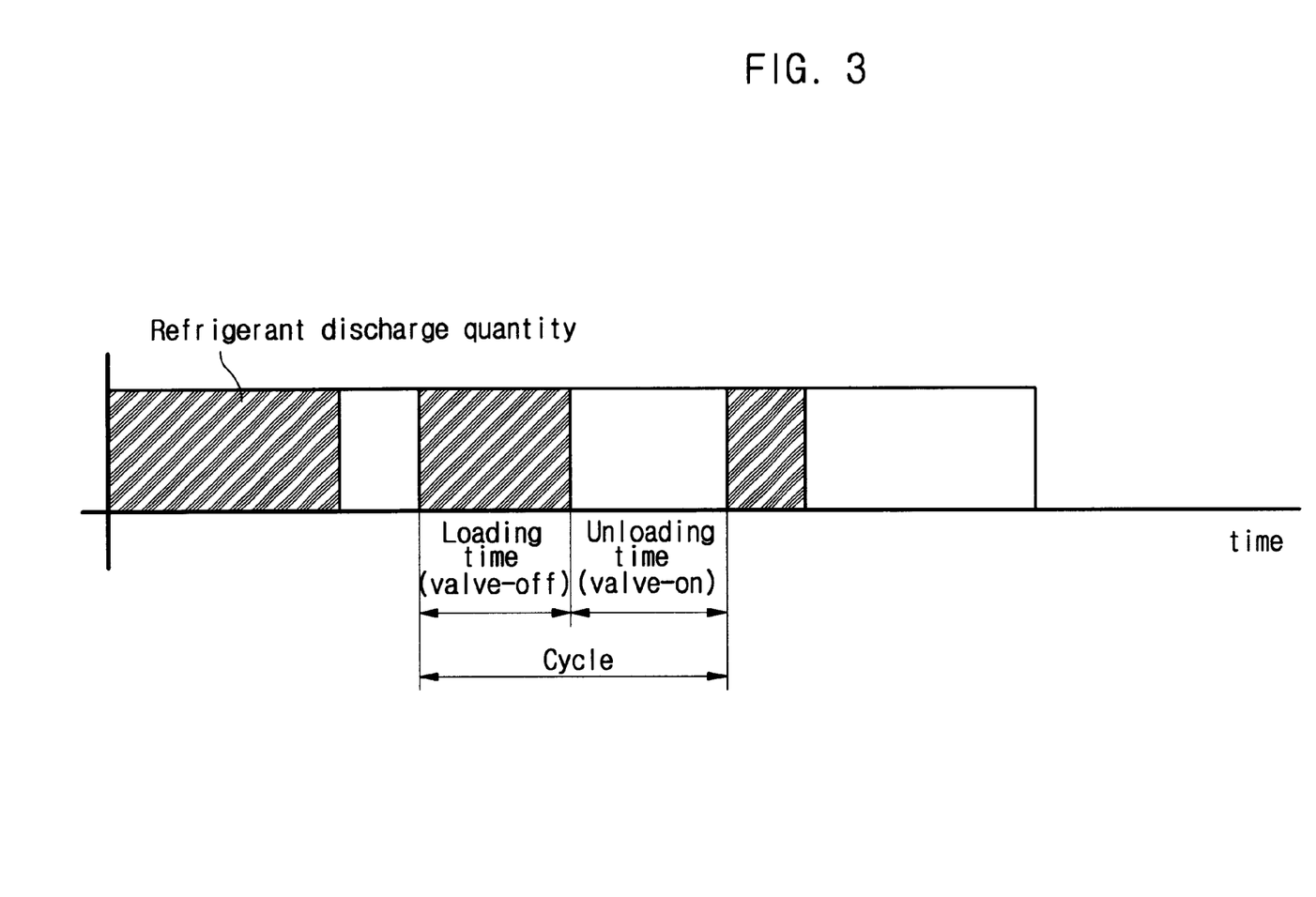
FIG. 3 is a graph showing a relationship among a loading time, an unloading time and the amount of discharged refrigerant during the operation of the compressor of FIGS. 2a and 2b.

As shown in FIG. 3, the compressor 2 periodically experiences the loading and unloading states during its operation. Loading time and unloading time vary according to required cooling capacity. During the loading time the temperature of the evaporator 5 is decreased because the compressor 2 discharges refrigerant, while during the unloading time the temperature of the evaporator 5 is increased because the compressor 2 does not discharge refrigerant. In FIG. 3, the hatched portions indicate the amount of discharged refrigerant. A signal for controlling loading and unloading times is referred to as a duty control signal. In the embodiments of the present invention, the capacity of the compressor 2 is varied in such a way that the loading and unloading times are varied according to the required total cooling capacity of the compressor 2 while each period is kept constant, for example, 20 seconds.

Figure 4:
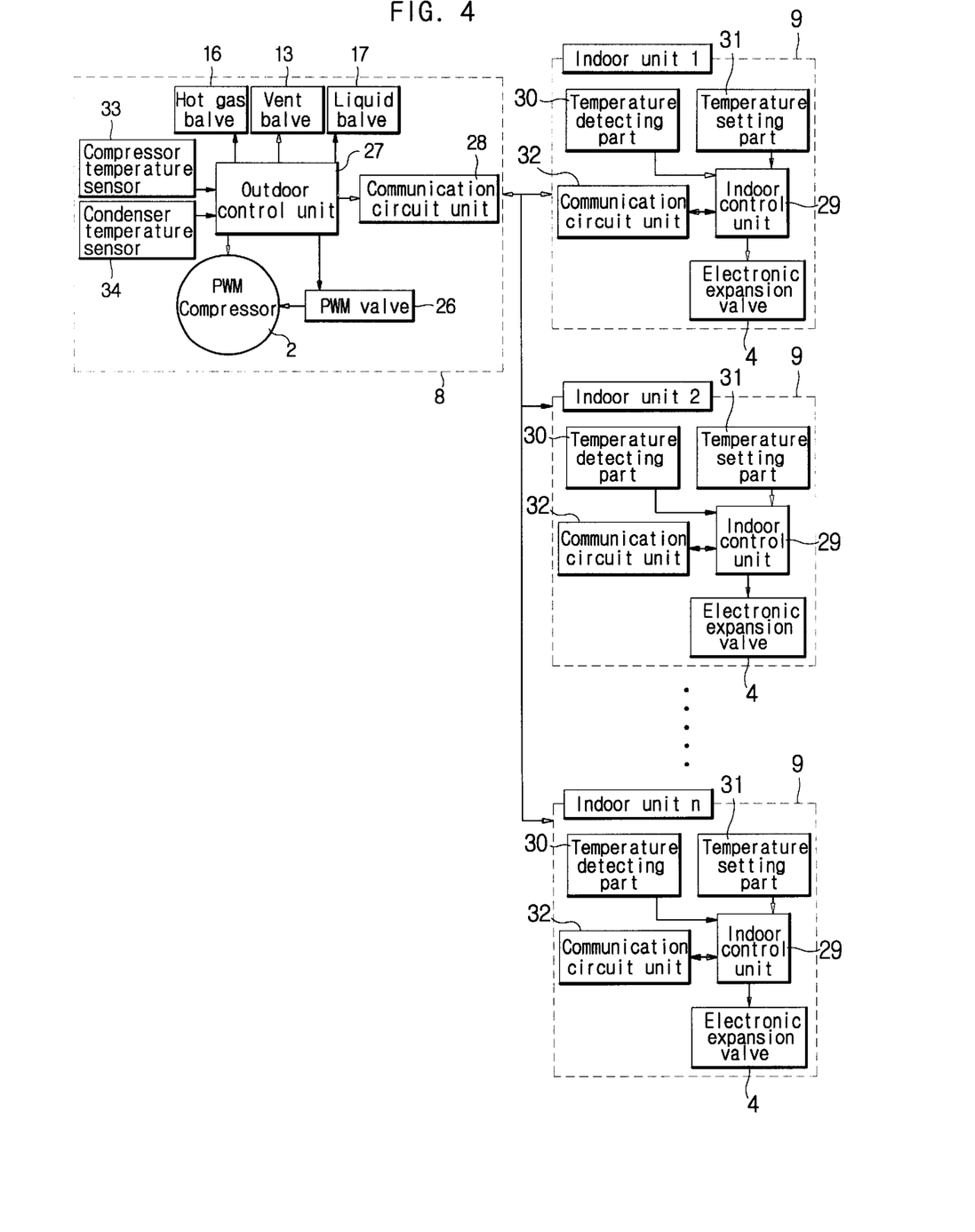
FIG. 4 is a block diagram showing the system for controlling the starting of an air conditioner in accordance with the present invention.

FIG. 4 is a block diagram showing the system for controlling the starting of an air conditioner in accordance with the present invention. As illustrated in FIG. 4, the outdoor unit 8 includes an outdoor control unit 27 that is connected to the compressor 2 and the PWM valve 26 to transmit and receive a signal. The outdoor control unit 27 is connected to an outdoor communication circuit unit 28 to transmit and receive data, and connected to the vent valve 13, the hot gas valve 16 and the liquid valve 17 to control the operation of these valves if necessary. Each of indoor units 9 includes an indoor control unit 29. A temperature detecting unit 30 and a temperature setting unit 31 are connected to the input port of the indoor control unit 29, and the electronic expansion valve 4 is connected to the output port of the indoor control unit 29. The temperature detecting unit 30 is a temperature sensor for sensing the temperature of a room to be air-conditioned. Each indoor unit 9 includes an indoor communication circuit unit 32 connected to an indoor control unit 29 to transmit and receive data. The outdoor communication circuit unit 28 and the indoor communication circuit unit 32 are constructed to transmit and receive data in a wire or wireless fashion.

In the present invention, the operations of the compressor 29 are divided into a normal operation and a starting operation. The normal operation designates the operation of the compressor that will be performed according to information on a required cooling capacity transmitted from the indoor unit after power is applied to the compressor and the starting of the compressor has been completed, while the starting operating designates the operation of the compressor that will be performed to start the compressor when a starting signal is transmitted to the compressor.

In a normal operation mode, the indoor control unit 29 receives signals from the temperature detecting unit 30 and the temperature setting unit 31, and calculates the required cooling capacity of the indoor unit 9 on the basis of the difference between an indoor temperature and a set temperature. Additionally, the indoor control unit 29 has information on the cooling capacity of the indoor unit itself, and can calculate a required cooling capacity on the basis of the difference between an indoor temperature and a set temperature and the cooling capacity of the indoor unit itself. The required cooling capacity of each indoor unit calculated as described above is transmitted through the communication circuit units 28 and 32 to the outdoor control unit 27. The outdoor control unit 27 calculates a total required cooling capacity to which the required cooling capacities of all the indoor units 9 add up. The compressor 2 is operated with its loading time and unloading time alternating with each other, which are preset depending on the total required cooling capacity.

Figure 5:
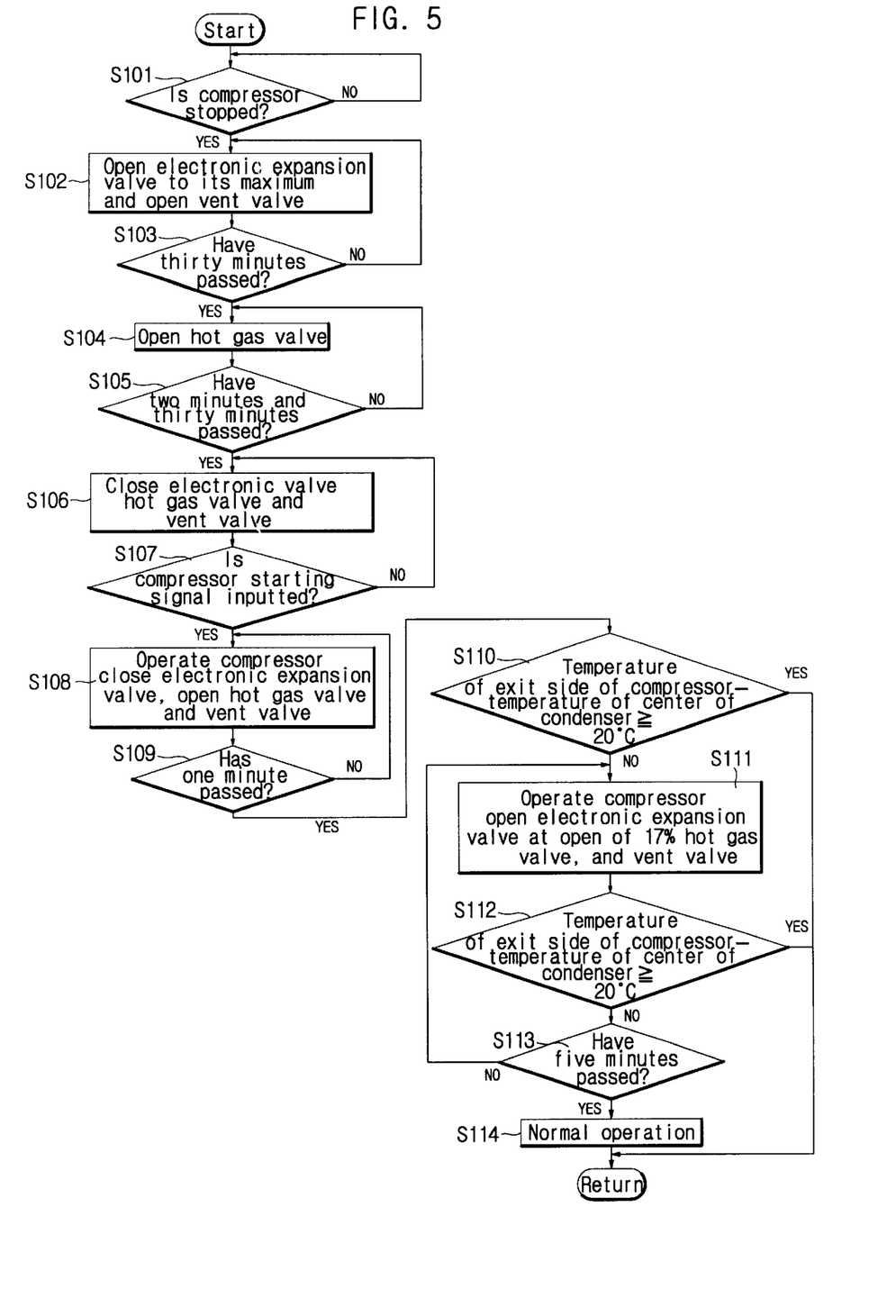
FIG. 5 is a flowchart showing a method for controlling the starting of an air conditioner in accordance with the present invention.

With reference to FIG. 5, a pressure balancing process prior to a starting operation and the starting operation are described. First, the outdoor control unit 27 determines whether the compressor 2 is stopped (S101). If the compressor 2 is stopped, the electronic expansion valve 4 and the vent valve 13 are completely opened (S102). It is determined whether thirty seconds have passed (S103). If thirty seconds have not passed, STEP 102 is continued; while if thirty seconds have passed, the hot gas valve 16 is opened (S104). Thereafter, it is determined whether three minutes(or two minutes and thirty seconds after the hot gas valve has been opened) have passed after electronic expansion valve 4 and the vent valve 13 are opened (S105). If three minutes have not passed, the electronic expansion valve 4, the vent valve 13 and the hot gas valve 16 are kept open; if three minutes have passed, the electronic expansion valve 4, the vent valve 13 and the hot gas valve 16 are closed (S106). The reason why the pressure balancing process of three minutes is performed is to reduce starting load at the early stage of starting by balancing high and low pressure in a cycle. In such a case, three minutes is a time required to balance high and low pressure in the cycle, but the time may be changed depending on particular systems.

Subsequently, the starting operation is described. In this embodiment, the starting operation is performed at two stages. The first stage starting operation will be described first. It is determined whether a starting signal for the compressor 2 is inputted (S107). If the starting signal is inputted, the compressor 2 is operated, the electronic expansion valve 4 is closed and the hot gas valve 16 and the vent valve 13 are opened (S108). In this case, the period of a duty control signal for controlling the compressor 2 is determined as being shorter than the period of a duty control signal for a normal operation. The reason why the period of the starting operation is set to be shorter than the period of a normal operation is that if the compressor 2 is operated by the periods of the normal operation, pressure fluctuation becomes great, thereby deteriorating the reliability of the compressor 2 and causing the safe starting of the compressor 2 to be difficult. Additionally, when the unloading time is relatively long during a normal operation, the starting of the compressor 2 takes a long time. While when the loading time is relatively long, a pressure drop becomes great and liquid refrigerant may flow from the accumulator 10 to the compressor 2. Accordingly, if the loading time is determined as being relatively short and a loading operation is frequently performed, the starting of the compressor can be accomplished rapidly and safely. In this embodiment, the period of the starting operation is 20 to 80% of the period of the normal operation, preferably 50%. The reason why the lowermost limit of the period of the starting operation is determined as 20% is that the loading time and the unloading time is set by the second and there is a restriction in the reduction of the lowermost limit. The reason why the uppermost limit is determined as 80% is that if the uppermost limit is determined as more than 80%, there is nearly no effect of the reduction of the period. Therefore, when the period of the normal operation is twenty seconds, the period of the starting operation is four to sixteen seconds, preferably, ten seconds.

During the first stage starting operation, the compressor is operated at 20 to 50% modulation. 20% modulation means that the compressor is operated while a two-second loading time and an eight-second unloading time are alternated. However, 30% modulation is preferable. In this case, a loading and unloading time ratio is 3:7. The reasons why the starting operation is performed at 50% or less modulation are that a limitation is imposed on an increase in modulation because the starting operation is not a normal operation and the reliability of the compressor may be deteriorated because a great pressure drop occurs due to an increase in modulation in a low temperature starting operation.

The first stage starting operation is performed for about one to five minutes, preferably, one minute. Accordingly, it is determined whether one minute has passed after the first stage starting operation is initiated (S109). If one minute has passed, a second stage starting operation is initiated.

The reason why all the electronic expansion valves 4 are closed while the first stage starting operation is performed is to prevent liquid refrigerant, which is contained in the receiver 11 and the evaporator 5 and has passed through the condenser 3, from entering the accumulator all at once and, thereafter, the compressor 2. Additionally, the electronic expansion valves 4 are closed, so low pressure refrigerant situated between each evaporator 5 and the compressor 2 is rapidly moved into the compressor 2 and is compressed and discharged, thereby allowing rapid starting to be accomplished.

In the meantime, when the compressor 2 is operated while all the electronic expansion valves 4 are closed, the pressure of refrigerant between each electronic expansion valve and the compressor 2 greatly drops and refrigerant is not circulated normally, resulting in the overheat of the compressor 2. Thus, the hot gas valve 16 is opened to connect the exit side of the compressor 2 with the low pressure conduit upstream of the accumulator 10. Accordingly, a portion of hot gas enters the accumulator 10, so the pressure of refrigerant situated in the accumulator 10 is prevented from greatly dropping and the compressor 2 is normally operated.

In addition, since refrigerant is not circulated normally while all the electronic expansion valves 4 are closed, refrigerant condensed in the condenser 3 cannot enter the receiver 11 rapidly. Accordingly, liquid refrigerant is allowed to flow into the receiver 11 in such a way that gaseous refrigerant contained in the receiver 11 is discharged to the low pressure side by opening the vent valve 13.

In the second stage starting operation, starting and some cooling are simultaneously achieved. First of all, it is determined whether the difference between the temperature of the exit side of the compressor 2 and the temperature of the center portion of the condenser is more than 10 to 30° C. (preferably, more than 20° C.) (S110). The temperature of the exit side of the compressor 2 is sensed by the compressor temperature sensor 33 situated on the exit side of the compressor 2, the temperature of the center of the condenser 3 is sensed by the condenser temperature sensor 34 situated at the center of the condenser 3, and the sensed temperatures are transmitted to the outdoor control unit 27. The outdoor control unit 27 calculates the difference between the temperature of the exit side of the compressor 2 and the temperature of the center of the condenser, and determines whether the difference is more than 10 to 30° C. (preferably, 20° C) (S110). If the difference is more than 10 to 30° C., the normal operation is initiated (S114); while if not, a soft starting operation is initiated (S111). The reason why the normal operation is initiated when the difference is more than 10 to 30° C. is that it is determined that the inflow of refrigerant into the compressor scarcely occurs. Accordingly, the temperature range can be changed depending on systems.

In the soft starting operation (S111), the duty signal period of the compressor 2 is 20 to 80% of the period of the duty signal period for a normal operation. Additionally, in the soft starting operation, the loading and unloading time ratio of the compressor 2 is 4:6 to 7:3. Since in the soft starting operation the starting operation is performed and the some cooling operation has to be performed by the supply of some refrigerant, the loading and unloading time ratio is somewhat increased in comparison with the loading and unloading time ratio for the first stage starting operation. In this case, the loading and unloading time ratio is preferably 5:5.

Additionally, in the soft starting operation (S111), the electronic expansion valve 4 is opened to the extent of 5 to 33% (preferably, 17%), and the hot gas valve 16 and the vent valve 13 are opened. The reason why the second stage starting operation is performed at modulation larger than the modulation for the first stage starting operation and the electronic expansion valve is opened to the extent of 17% is that safe starting is achieved by the prevention of the inflow of the refrigerant into the compressor 2 and the starting operation is smoothly changed to the normal operation.

Meanwhile, even while STEP 111 is performed, it is determined whether the difference between the temperature of the exit side of the compressor 2 and the temperature of the center of the condenser is more than 10 to 30° C. (preferably, 20° C.) (S112). If the difference is more than 10 to 30° C. (preferably, 20° C.), the normal operation is initiated (S114). Otherwise, the normal operation is initiated after performing STEP 111 for a preset time. In other words, if the difference between the temperature of the exit side of the compressor 2 and the temperature of the center of the condenser is not more than 10 to 30° C. (preferably, 20° C.), then while STEP 111 is performed, it is determined whether three to eight minutes (preferably, five minutes) have passed (S113). If three to eight minutes (preferably, five minutes) have passed, the normal operation (S114) is initiated. The reason for this is that when three to eight minutes (preferably, five minutes) have passed, the operation of the compressor 2 enters safe stage and the inflow of liquid refrigerant scarcely occurs. In this case, the time period (three to eight minutes) is determined in the consideration of the fact that a long time period is better for safe starting and a short time period is better for rapid starting.

INDUSTRIAL APPLICABILITY

As described above, the present invention provides a system and method for controlling the starting of an air conditioner, in which a pulse width modulated compressor is employed and the electronic expansion valve, the hot gas valve and the vent valve are suitably controlled, thereby allowing the starting of the air conditioner to be performed rapidly and safely. Additionally, the system and method for controlling the starting of an air conditioner is capable of preventing the inflow of liquid refrigerant in the air conditioner while the compressor is operated.

In addition, the present invention provides a system and method for controlling the starting of an air conditioner, which performs the starting operation of the compressor at two stages, thereby allowing starting and normal operations to be smoothly connected.

What is claimed is:

1. A system for controlling starting operation of an air conditioner, comprising:
   a compressor controlled in a pulse width modulation manner according to a duty control signal;
   an electronic expansion valve for expanding refrigerant compressed in said compressor;
   a high pressure conduit connecting the exit side of said compressor and the inlet side of said electronic expansion valve;
   a low pressure conduit connecting the exit side of said electronic expansion valve and the inlet side of said compressor;
   a bypass conduit connected at its first end to the high pressure conduit and at its second end to the low pressure conduit;
   a flow rate regulating valve mounted on said bypass conduit for regulating a flow rate of fluid flowing through said bypass conduit; and
   a control unit for controlling said electronic expansion valve, said flow rate regulating valve and said compressor to perform two starting operations in such a way that said flow rate regulating valve is open and said electronic expansion valve is closed in a first starting operation, and said flow rate regulating valve is open and said electronic expansion valve is open to a predetermined extent in a second starting operation, said compressor being controlled by a duty control signal having a period shorter than a period for a normal operation during said starting operations.

2. The system according to claim 1, further comprising an accumulator positioned on said low pressure conduit.

3. The system according to claim 2, wherein said bypass conduit is a hot gas bypass conduit connecting a high pressure conduit situated between said compressor and said condenser and said accumulator, and said flow rate regulating valve is a hot gas valve positioned on said hot gas bypass conduit.

4. The system according to claim 2, further comprising:
   a receiver positioned on said high pressure conduit between said condenser and said electronic expansion valve,
   wherein said bypass conduit is a vent bypass conduit connecting said receiver and a upstream side of said accumulator, and said flow rate regulating valve is a vent valve positioned on said vent bypass conduit.

5. The system according to claim 1, wherein said duty control signal for said starting operation of said compressor has a period corresponding to a period of 20 to 80% of a duty control signal for a normal operation of said compressor.

6. The system according to claim 1, wherein said compressor has a loading and unloading time ratio of 4:6 to 7:3 during said second stage starting operation.

7. The system according to claim 1, further comprising a compressor temperature sensor for sensing the temperature of the exit side of said compress and a condenser temperature sensor for sensing the temperature of the center of said condenser,
   wherein said second stage starting operation is performed until the difference between a temperature of an exit side of said compressor and a temperature of a center of said condenser becomes 10 to 30° C.

8. The system according to claim 1, wherein said second stage starting operation is performed for three to eight minutes.

9. A method for controlling the starting of an air conditioner, said air conditioner including a compressor controlled in a pulse width modulation according to a duty control signal and an electronic expansion valve expanding the compressed refrigerant, comprising:
   determining whether a starting signal for said compressor is inputted;
   operating said compressor for a predetermined time period at a period of duty control signal shorter than a period of duty control signal for a normal operation while closing said electronic expansion valve and opening a flow rate regulating valve positioned on a bypass conduit connecting exit and inlet sides of said compressor in a first starting operation, when said starting signal is inputted; and operating said compressor for a predetermined time period at a period of duty control signal shorter than a period of duty control signal for a normal operation while opening said electronic expansion valve to a predetermined extent and opening said flow rate regulating valve in a second starting operation.

10. The method according to claim 9, wherein said period of the duty control signal for said second starting operation is 20 to 80% of said period for a normal operation.

11. The method according to claim 9, wherein said operation of said compressor for said second starting operation is performed at a loading and unloading time ratio of 4:6 to 7:3.

12. The method according to claim 9, wherein said second starting operation is performed until a difference between a temperature of an exit side of said compressor and a temperature of a center of said condenser becomes 10 to 30° C.

13. The method according to claim 9, wherein said second starting operation is performed until it is determined that liquid refrigerant does not enter said compressor substantially.

14. The method according to claim 9, wherein said second starting operation is performed for three to eight minutes.

15. The method according to claim 9, wherein said electronic expansion valve is opened to the extent of about 5 to 33% in said second starting operation.

* * * * *